United States Patent [19]
Chang

[11] Patent Number: 6,062,816
[45] Date of Patent: May 16, 2000

[54] CEILING FAN

[76] Inventor: Li-Er Lin Chang, No. 160, Si-Shih Road, Feng Yuan City, Taichung Hsien, Taiwan

[21] Appl. No.: 09/198,409

[22] Filed: Nov. 24, 1998

[51] Int. Cl.[7] .................................................. F04D 29/32
[52] U.S. Cl. ..................... 416/5; 416/244 R; 416/210 R; 362/96; 362/249; 362/294; 403/337
[58] Field of Search ..................... 416/5, 210 R, 416/244 R, 170 R; 362/96, 249, 294; 403/337, 348, 364

[56] References Cited

U.S. PATENT DOCUMENTS 5,033,113  7/1991  Wang .......................................... 416/5
5,035,398  7/1991  Chiang ..................................... 403/348
5,993,159  11/1999  Mack ........................................... 416/5

Primary Examiner—Edward K. Look
Assistant Examiner—Liam McDowell
Attorney, Agent, or Firm—Browdy and Neimark

[57] ABSTRACT

A ceiling fan consists of a revolving motor having a plurality of fan blade mounts, a control device located under the revolving motor, a mounting piece located between the motor and the control device and provided with a plurality of first locating portions, a seat provided with a receiving space and a receiving port which is complementary to the mounting piece and provided with a plurality of second locating portions. The revolving motor is received in the receiving space. The seat is provided with a main lampshade and a plurality of auxiliary lamp seats.

7 Claims, 2 Drawing Sheets

CEILING FAN

FIELD OF THE INVENTION

The present invention relates generally to a ceiling fan.

BACKGROUND OF THE INVENTION

The conventional ceiling fans are generally not cost-effective in light of their structural complexity and the burdensome test of component parts. The structural complexity of the conventional ceiling fans often affects adversely the packaging efficiency as well as the shipping cost.

SUMMARY OF THE INVENTION

The primary objective of the present invention is to provide an improved ceiling fan which is relatively simple in construction and is therefore free from the drawbacks of the conventional ceiling fans described above.

The ceiling fan of the present invention consists of a motor having a plurality of fan blade mounts, a control device located under the motor, a mounting piece located between the motor and the control device and provided with a plurality of first locating portions, a seat provided with a receiving space and a receiving port which is complementary to the mounting piece and provided with a plurality of second locating portions. The motor is received in the receiving space. The seat is provided with a main lampshade and a plurality of auxiliary lamp seats.

DETAILED DESCRIPTION OF THE INVENTION

Figure 1:
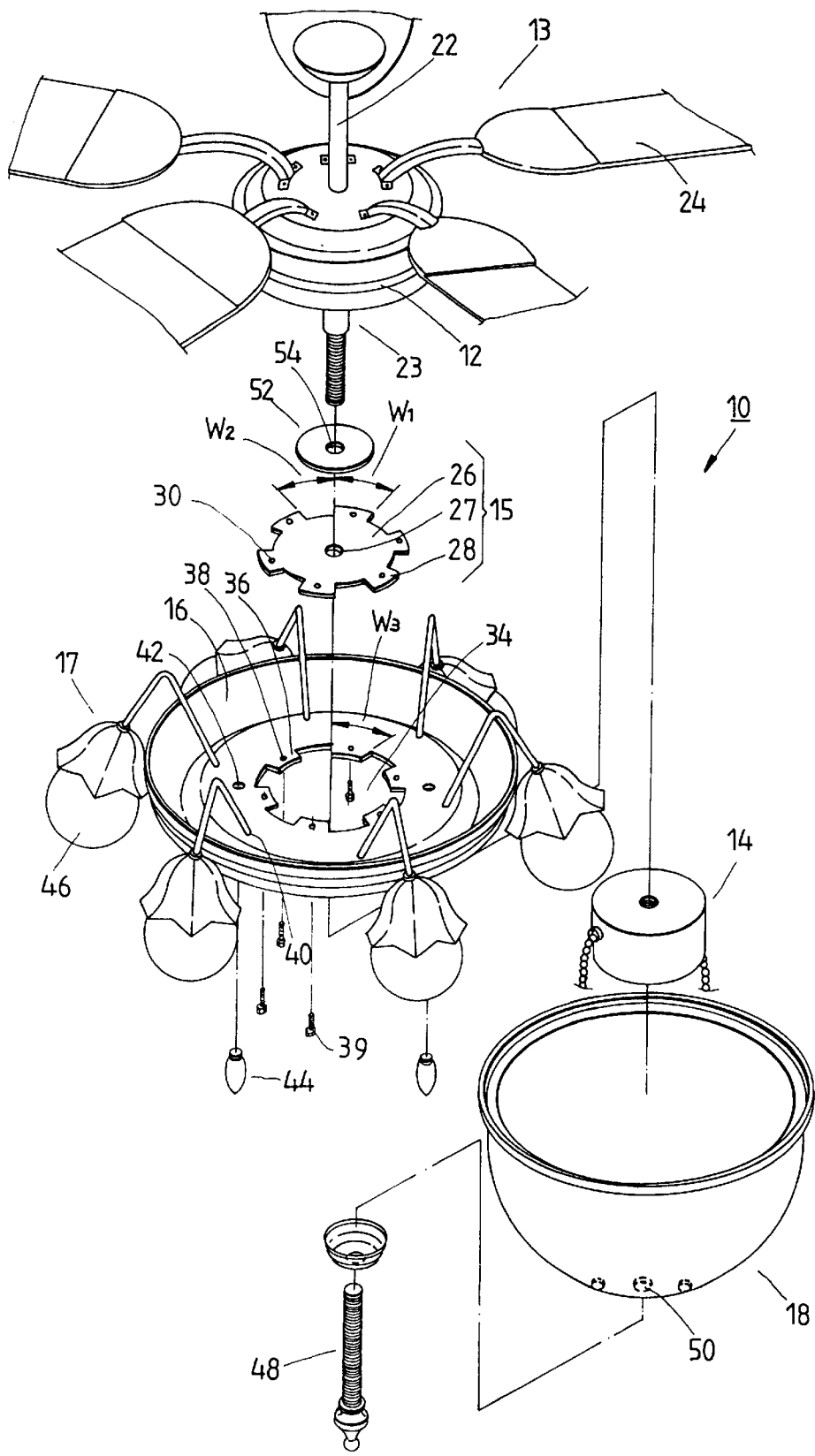
FIG. 1 shows an exploded view of a preferred embodiment of the present invention.
Figure 2:
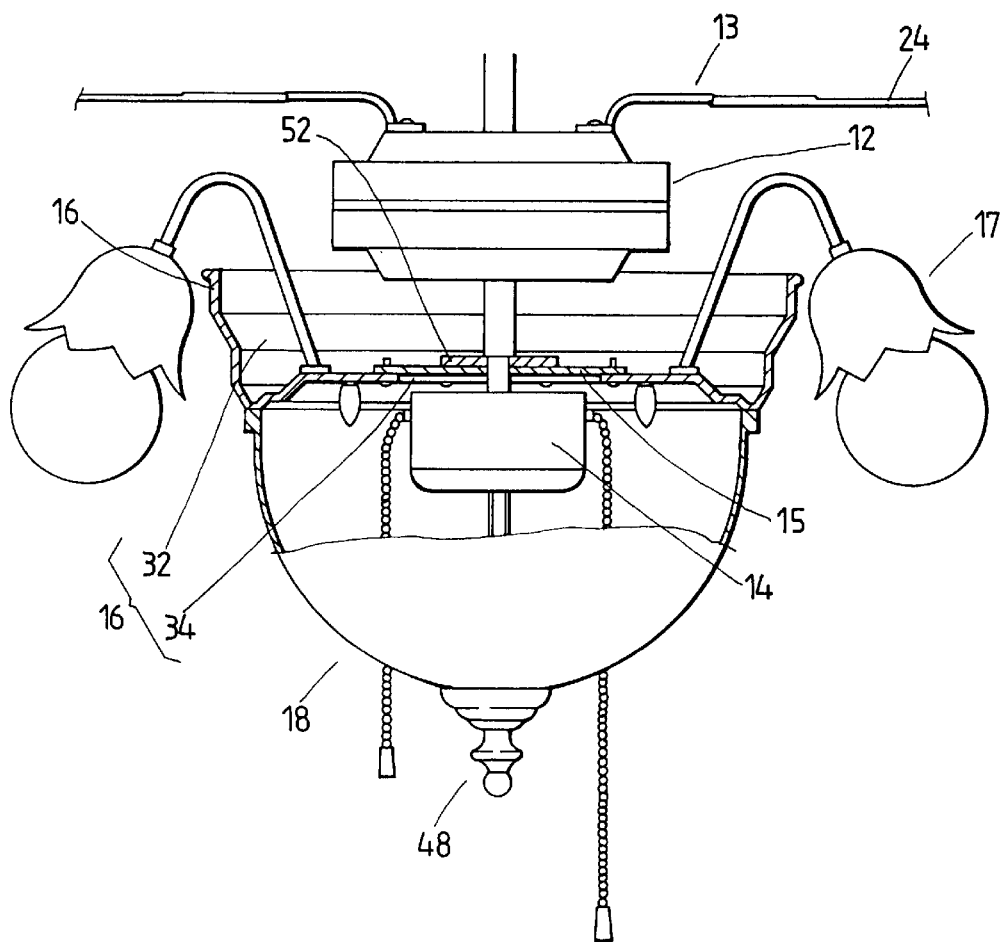
FIG. 2 shows a longitudinal sectional view of the preferred embodiment of the present invention in combination.

As shown in all drawings provided herewith, a ceiling fan 10 embodied in the present invention is composed of a revolving motor 12 having a plurality of fan blade mounts 13, a control device 14, a mounting piece 15, a seat 16 having a plurality of auxiliary lamp seats 17, and a main lampshade 18.

The revolving motor 12 is fastened with a support rod 22 which is fastened at one end thereof onto the ceiling. The revolving motor 12 has an output shaft 23 extending in the direction away from the ceiling. The fan blade mounts 13 are located along the edge of the top of the revolving motor 12 for mounting the fan blades 24.

The control device 14 is fastened with the output shaft 23 for controlling the circuit of the ceiling fan 10.

The mounting piece 15 has a main body 26, a center through hole 27, and six first locating portions 28 arranged at an interval W2 along the edge of the main body 26. The first locating portions 28 are rectangular in shape and equal to one another in width W1. The width W1 is equal to the interval W2. Each of the first locating portions 28 is provided with a threaded hole 30. The mounting piece 15 is located between the motor 12 and the control device 14 without making contact with them.

The seat 16 is made of a metal material and provided with a receiving space 32 for receiving the motor 12. The receiving space 32 has a bottom which is thickened to enhance its structural strength and provided at the center thereof with a receiving port 34 complementary with the mounting piece 15. The receiving port 34 has six second locating portions 36 which are provided with a through hole 38 corresponding in location to the threaded hole 30 of the first locating portions 28. The first locating portions 28 and the second locating portions 36 are fastened together by screws 39. The second locating portions 36 have a width W3, which is equal to the interval W2 of the first locating portions 28. The bottom of the seat 16 is provided along the periphery thereof with a plurality of locating holes 40 and is further provided with two receiving holes 42 located between the locating holes 40 and the receiving port 34. The two receiving holes 42 are intended to receive two main lamp bulbs 44.

The auxiliary lamp seats 17 are located by the locating holes 40 of the seat 16 and are intended to hold the auxiliary lamp bulbs 46 which are connected with the control device 14.

The main lampshade 18 is made of a transparent or translucent material and provided in the bottom wall thereof with a through hole 50. The main lampshade 18 is fastened under the seat 16 by a fastening means 48 which is engaged with the control device 14 via the through hole 50.

The ceiling fan 10 of the present invention is further composed of a locating piece 52, which is located between the motor 12 and the mounting piece and provided in the center thereof with a hole 54 for receiving the output shaft 23 of the motor 12. The locating piece 52 is in contact with the mounting piece 15.

Figure 3:
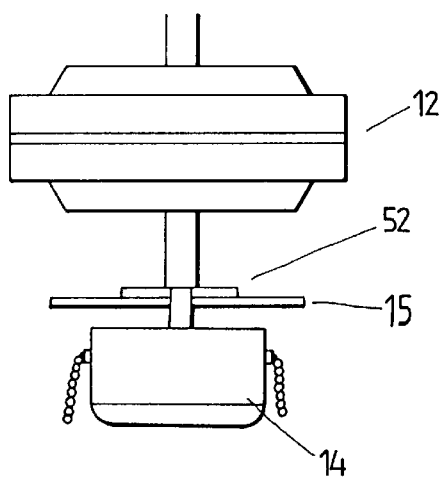
FIG. 3 shows a partial schematic view of the preferred embodiment of the present invention in combination.

Unlike the complicated test of the finished product of the conventional ceiling fan, the test of the finished product of the ceiling fan 10 of the present invention is relatively simple and cost-effective. As shown in FIG. 3, the ceiling fan 10 is connected with the power source after the assembly of the motor 12, the locating piece 52, the mounting piece 15, and the control device 14 is completed. The state of power connection of the motor 12 and the control device 14 can be tested. In packaging the finished product of the ceiling fan 10 of the present invention, the seat 16 and the auxiliary lamp seats 17 are packaged separately from other component parts. In addition, the ceiling fan 10 of the present invention is so simple in construction that the ceiling fan 10 can be installed by the consumer. The mounting piece 15 can be made of the bottom of the seat 16 by punching and pressing, so as to cut the material cost of the ceiling fan 10.

The embodiment of the present invention described above is to be deemed in all respects as being merely illustrative and restrictive. Accordingly, the present invention may be embodied in other specific forms without deviating from the spirit thereof. The present invention is therefore to be limited only by the scopes of the following appended claims.

What is claimed is:

1. A ceiling fan comprising:
   a revolving motor;
   a plurality of fan blade mounts located along an edge of a top of the motor for mounting fan blades of the ceiling fan;
   a control device fastened with a lower end of the revolving motor;
   a seat located between the revolving motor and the control device;
   a plurality of auxiliary lamp seats fastened at one end thereof with the seat such that other end of the auxiliary lamp seat is jutted out of the seat;

a main lampshade fastened at an open end thereof with a bottom end of the seat;

wherein the ceiling fan further comprises:

a mounting piece located between the revolving motor and the seat without making contact with the motor and the seat and provided along a periphery thereof with a plurality of first locating portions which are arranged at an interval and made integrally with said mounting piece;

wherein said seat is provided with a receiving space and a receiving port complementary with said mounting piece and for the control device to be put therethrough, said receiving port provided with a plurality of second locating portions, which are connected with said first locating portions so as to enable the revolving motor to be received in said receiving space.

2. The ceiling fan as defined in claim 1 further comprising a locating piece disposed between the revolving motor and said mounting piece such that said locating piece is in contact with the mounting piece.

3. The ceiling fan as defined in claim 1, wherein said mounting piece has a body; wherein said first locating portions are located along a periphery of said body at an interval; and wherein said first locating portions have a width equal to said interval.

4. The ceiling fan as defined in claim 1, wherein said second locating portions are rectangular in shape and have a width equal to said interval of said first locating portions.

5. The ceiling fan as defined in claim 4, wherein said second locating portions are rectangular in shape and have a width equal to said interval of said first locating portions.

6. The ceiling fan as defined in claim 4, wherein said first locating portions are provided with a threaded hole.

7. The ceiling fan as defined in claim 6, wherein said second locating portions are provided with a through hole corresponding in location to said threaded hole.

\* \* \* \* \*